United States Patent [19]
Burk

[11] 3,888,710
[45] June 10, 1975

[54] PROCESSING CABLE FILLING COMPOUNDS

[75] Inventor: William R. Burk, Lake Jackson, Tex.

[73] Assignee: The Dow Chemical Company, Midland, Mich.

[22] Filed: May 10, 1974

[21] Appl. No.: 468,775

[52] U.S. Cl............ 156/48; 174/110 PM; 174/116; 252/63; 260/897 A
[51] Int. Cl. ............................................ H01b 13/00
[58] Field of Search.......... 156/47, 48; 174/110 PM, 174/110 SR, 116, 23 R, 23 C, 25 C, 25 P; 252/63, 64; 260/897 R, 897 A

[56] References Cited
UNITED STATES PATENTS

| | | | |
|---|---|---|---|
| 3,125,548 | 3/1964 | Anderson..................... | 260/897 A X |
| 3,176,052 | 3/1965 | Peticolas........................ | 260/897 A |
| 3,375,303 | 3/1968 | Joyce.............................. | 260/897 A |
| 3,645,929 | 2/1972 | Normanton et al......... | 260/897 A X |

Primary Examiner—Charles E. Van Horn
Assistant Examiner—David A. Simmons
Attorney, Agent, or Firm—Lester J. Dankert

[57] ABSTRACT

Cable filling compounds, e.g., for telecommunications cables, which are blends of low density polyethylenes having major proportion of low molecular weight and minor proportion of high molecular weight polyethylenes, are advantageously prepared from a melt blend at a temperature above the melting point by quickly cooling the blend to a temperature below 90°C, preferably from a temperature above 135°C to below 75°C, to form a grease-like material useful in filling cables by cold filling processes. The filling compound resists flowing out of the filled cable at temperatures below about 80°C.

8 Claims, No Drawings

PROCESSING CABLE FILLING COMPOUNDS

BACKGROUND OF THE INVENTION

The invention relates to filler compositions for electrical cables, particularly for cold filling of telecommunication cables.

In the art of designing and constructing electrical cables, especially telecommunication cables such as telephone cables, it is known to assemble insulated conductors in a core surrounded by wrapping, shield and jacket components and to fill or flood the otherwise empty interstitial spaces within the core and elsewhere within the cable with an insulating oil, grease or plastic composition known generically as cable filling compound or filler. The principal purpose of the cable filling compound is to safeguard the cable, in the event the cable jacket and shield are penetrated, by preventing or minimizing the entry of water into the interior of the cable and the deleterious consequences of flow of water liquid and vapor longitudinally within the cable from the point of penetration.

Among the general requirements for a suitable cable filling compound are certain physical, chemical and electrical properties. It should have low dielectric constant and high chemical stability under conditions of cable use. It should not soften or weaken the plastic insulation or jacket of the cable. It should be capable of fluid flow into the cable spaces during manufacture but resist flowing out of the cable ends of settling from relatively high elevated portions of the cable into portions at lower levels.

In applicant's copending application, Ser. No. 468,776, filed concurrently herewith, s, there are disclosed new and advantageous cable filling compositions which are blends of low density polyethylenes composed of a major proportion of relatively low molecular weight polyethylene constituent and a minor proportion of relatively high molecular weight polyethylene such that the blends are soft semi-solids having grease-like consistency at normal room temperature. Cables such as telecommunication cables filled therewith pass standard drainage tests up to about 80°C. are flexible at low temperatures, and show no deleterious effects of the filler on the cable plastic insulation or jacket.

The new cable filling compositions can be used in hot filling processes known to the cable art. However, hot filling is objectionable because of the obvious hazards to workers and equipment handling hot, molten plastic material, and the heat of such materials endangers the insulation and other components of the cable structure. Moreover, on eventual cooling of hot filled cable, shrinkage occurs which tends to form voids in the cable. Accordingly, it is often preferred to fill cables by cold filling process.

Cold filling of cables requires that the compound by pumpable at ambient room temperature but has many advantages over hot filling: voids caused by cooling shrinkage are avoided, greater degree of filling can be achieved, and the process is safer. A disadvantage of cold filling is that most compounds which are pumpable at ordinary room temperature will become quite fluid at higher temperature and will flow or drain from the cable, i.e., they do not pass the drainage tests required by the cable manufacturers for use in cables to be subjected to higher temperature service conditions. Petrolatum (petroleum jelly) is such a material: cables can be cold filled with petrolatum, but the filler will drip or drain out of the cable at elevated temperature, e.g., 60°C.

In U.S. Pat. No. 3,801,359, it is disclosed that cables filled with filling compositions which are mixtures of petrolatum and polyethylene are resistant to dripping up to 80°C when the composition is rapidly cooled from above its melting point to a lower temperature at which the composition is solid but still soft, and the soft solid composition is forced into the cable core. However, petrolatum compositions are often found objectionable in cables because they tend to swell and soften the polyethylene commonly used for insulation and jacket materials.

A heat-resistant composition which is pumpable at ambient temperature and useful in cold filling processes is shown in U.S. Pat. No. 3,683,104. However, the special additives required in that composition are not always readily available.

As mentioned hereinbefore, the cable filling compositions described and claimed in applicant's concurrently filed application are advantageous; they have no detrimental effect on the cables and are heat resistant, i.e., resist flowing or draining out of the cables even at elevated test temperature. However, it was found that the compositions varied considerably in their flow properties at ordinary room temperature, even as to compositions of the same formulation which were identical when hot and which gave the same results in cables made by the hot fill process. Sometimes, but not always or predictably, the compositions would have room temperature characteristics allowing them to be used in cold fill processes of the cable filling art.

An object of this invention is to further improve the polyethylene blend cable filling compositions, particularly to enable them to be used in cold filling processes of cable manufacture. Another object is to provide method and means for treating polyethylene blend cable filling compositions to render the same capable of being pumped at or near ambient room temperature. Other objects and advantages of the invention will become apparent in the description which follows.

SUMMARY OF THE INVENTION

The objects of the invention are attained by method and means for treating or conditioning polyethylene blend filler compositions to render them amenable to use in cold filling processes. The treatment in essence comprises quickly cooling the polyethylene blend composition from above its melting point to a temperature below about 90°C, preferably below about 75°C. The melted blend composition, which is a viscous liquid at a temperature above its melting point, is converted by such treatment to a soft semi-solid having grease-like consistency at ambient room temperature.

DETAILED DESCRIPTION AND EMBODIMENTS

The cable filling compositions with which this invention is concerned are described and claimed in applicant's concurrently filed patent application, Ser. No. 469,776. They are blends of low density, free-radical initiated, polyethylenes composed of a major proportion of relatively low molecular weight polyethylene constituent A and a minor proportion of relatively high molecular weight of polyethylene constituent B. Constituent A is usually from about 80 to about 99, preferably from about 89 to about 95, percent by weight, and constituent B is correspondingly from about 1 to about 20, preferably from about 5 to about 11, percent by weight based on the combined weights of constituents A and B. The molecular weights (MW) of the constituents A and B are weight average molecular weights measured by gel permeation chromatography. Constituent A has MW from about 800 to about 3,000, preferably from about 1,500 to about 2,200. Constituent B has MW from about 70,000 to about 300,000 preferably from about 100,000 to about 150,000.

The constituents are further characterized by their melt flow properties, particularly by measuring their rates of extrusion through a die of the extrusion plastometer in apparatus and by means described in ASTM Standard Method Designation D-1238-70.

The melt flow rate of constituent B can be measured under Condition E of that method, i.e. at 190°C under total load of 2,160 g. using the standard die orifice of 0.0825 ± 0.0002 inch (2.0955 ± 0.0051 mm). Under these conditions the "Melt Index," i.e. the melt flow rate value, of constituent B is from about 0.2 to about 250 decigrams per minute (dg/min), preferably from about 20 to about 50 dg/min.

The melt flow rate of constituent A under Condition E of ASTM D-1238 is too high to be conveniently measured, so modification must be made. The general apparatus and procedure of ASTM Designation 1238-70 are used, but the test is run at 50°C with 2160 g total load on the plastometer piston and using a die having an orifice opening of 0.0200 ± 0.0002 inch (0.508 ± 0.0051 mm) in place of the standard orifice die. By the so-modified test, the melt flow rate value of constituent A is from about 5 to about 140, preferably from about 25 to about 35, dg/min. Each of constituent A and constituent B can be composed of two or more of such materials provided that each component of such constituent has properties as specified herein for the respective constituent A or B and that the composite of components, if plural, making up the particular constituent complies with the description of that constituent.

The low density polyethylene constituents required in these cable filling compositions are individually known kinds of materials made in known manner by polymerization of ethylene under high pressure and temperature in the presence of free-radical initiator such as molecular oxygen, organo per-oxygen compounds or organo-azo compounds. By "low density polyethylene" is meant a polymer of ethylene made by such high pressure, high temperature process with free radical initiation of polymerization. The density of such polymers is usually in the range from about 0.85 to about 0.93 g/cc at 25°C. By "polyethylene" it is meant to include polymers of ethylene obtained by polymerization of ethylene alone or of ethylene together with minor amounts of lower alkene, especially propylene and butene-1, or of ethylene together with minor amounts of lower alkanes as telogen, such as ethane, propane or n-butane. The addition of lower alkene or lower alkane is a known expedient to decrease the molecular weight of the ethylene polymer product and is usually employed in making constituents A and B.

The initial blending of low density polyethylene constituents A and B to form the cable filling composition is carried out by intimately mixing the constituents in desired proportions, heating the mixture to melt the constituent B and to reduce the viscosity of the mixture, and stirring it to blend the materials together while melted. The melt blending temperature is above about 105°C, preferably at least about 135°C, e.g., from about 135° to about 200°C, but below the temperature of decomposition or objectionable fuming of the polymer mixture.

It is customary to include in the composition of starting constituents A and B small amounts of antioxidants and stabilizers such as 2,6-di-tert-butyl-4-methylphenol or 4,4′-thiobis(2-tert-butyl-5-methyl-phenol). Further amounts of such agents can also be added to the present blend composition. Where needed or desired, other kinds of additaments such as finely divided silica can be incorporated in the filler compound as known in the cable filling art. There can also be added to the present blend compositions hollow, synthetic thermoplastic particles, as described in U.S. Pat. No. 3,683,104, having generally spherical configuration and diameters in the range from about 0.5 to about 200 microns. When used, such particles are dispersed in the present cable filler composition in proportions of up to about 10 parts per 100 parts of the polyethylene blend, by weight. Additaments can be incorporated into the polyethylene blend anytime prior to use as cable filler, but are most conveniently admixed when the blend of polyethylenes is being stirred as a melt before congealing to its grease-like consistency.

After thorough blending of the constitutents, the melt blended composition, in accordance with the present invention, is cooled as rapidly as possible from above about 105°C, preferably from above about 135°C, to a temperature below about 90°C, preferably below about 75°C, thereby forming a grease-like product. Thereafter, the product can be allowed to cool, e.g., from about 75°C, to ambient room temperature. It is usually convenient to draw off the grease from the cooling step to storage containers at warm temperature, e.g., 50°C. The operations can be carried out in batches or in continuous manner as would be apparent to those skilled in the art.

The resulting grease-like composition has physical properties dependent in part upon the kind and proportion of specific constituents blended together. In general, the melt flow property of the blended composition, tested by the modified ASTM procedure D-1238 as previously described herein using 50°C, 2160 g total load and 0.0200 inch (0.508 mm) orifice, is in the range from about 0.1 to about 25, preferably from about 0.5 to about 10, most preferably from about 1 to about 5, dg/min.

The cable-filling compositions prepared as just described can be used to fill cables such as communication cables, e.g., telephone cables is conventional manner, using either hot filling or cold filling technique. One such cable-filling procedure is described in U.S. Pat. No. 3,607,487. Another procedure, particularly adapted for use of the present semi-solid soft greaselike composition is shown in U.S. Pat. No. 3,801,359; in such process the composition can be used at ambient room temperature or in warm condition coming from incomplete cooling of the melt or in re-warmed condition. As is known to the cable artisan, in the making of multi-pair communication cables, a number of individually insulated twisted conductor pairs are brought together in a forming zone to form a bundle which will become the core of the cable. The core bundle may be composed of several sub-bundles, each held together with a spiral wound thread. In "filled" cables, the conductor bundle is passed through a stuffing box or impregnator wherein the filler compound is forced into the bundle, displacing the air and filling the interstitial spaces between the conductor and other mechanical elements of the bundle with the filling composition.

In some instances, the forming zone and the filling zone are in effect combined so that the filler is forced around and among the twisted conductor pairs as they are brought together to form a core bundle containing filler compound. In either case, the so-filled bundle then passes to subsequent operations of the cable manufacturing line to complete the cable construction, such as a zone where plastic film is wrapped or folded about the conductor bundle, a zone where a tape of metal foil such as aluminum or copper is folded longitudinally or wound helically about the core to provide a mechanical and electrical shield, and a zone where a crosshead extruder provides the cable with a seamless extruded plastic outer jacket. If desired, facilities can be provided on the cable line to apply further amounts of filler compound, e.g., over the plastic wrap before or together with the metal shield, or over the metal shield before the plastic outer jacket.

In a typical such filled cable, a plurality of insulated conductors are arranged in a generally cylindrical bundle surrounded by a core wrap of tough plastic film and a metal shield, e.g., a longitudinally folded tape with overlapped seam. A plastic outer jacket surrounds the metal shield. The cable filler is disposed in the interstices between the insulated conductors within the core wrap. The conductors are generally copper covered with polyethylene or other known insulation. The core wrap is usually poly(ethylene terephthalate) or polypropylene film. The shield is usually of aluminum or copper, or a plurality of shields can be used such as aluminum or copper next to the core wrap and a steel tape folded thereover. The outer jacket may be composed of any suitable cable jacketing composition such as, for example, polyethylene, polymers of ethylene, polypropylene or chlorinated polyethylene, usually compounded with carbon black.

The shield is advantageously formed of aluminum having an adhesive coating on at least the outer surface when placed over the core wrap for the purpose of providing a sealing bond in the lap seam of the shield and of bonding the shield to the outer plastic jacket. Suitable exemplary adhesives include random and graft copolymers of ethylene and $\alpha,\beta$-ethylenically unsaturated carboxylic acid such as acrylic acid and methacrylic acid and such copolymers which also include esters of such acids, partial salts of such acids (ionomers), vinyl acetate, and the like.

Filling compositions made in accordance with this invention can also be used to fill electrical devices other than cables, to exclude water and moisture therefrom or to hold their parts in spaced relationship, such as splice boxes, junction boxes, terminal boxes and the like.

The improvements in accordance with the present invention are obtained principally by cooling the polyethylene blend composition from a temperature above its melting point temperature, usually above about 105°C, preferably from at least about 135°C, as rapidly as possible to a temperature below about 90°C, preferably at most about 75°C. The cooling time should be not more than about 30 minutes from about 135°C to about 75°C, and is preferably less than 15, more preferably less than 5, minutes.

Any apparatus capable of effecting rapid cooling by heat-exchange with the initially hot molten polyethylene blend is suitable for the present purposes. Typical such apparatus includes tube and shell heat exchangers, concentric tube heat exchangers, auger feed concentric tube heat exchangers, and scraped wall heat exchangers. Cooling agents on the other side of the heat exchange surface wall can be water or other aqueous media, brine, or other heat exchange fluids flowing concurrently, contercurrently, or transversely of the polyethylene blend flow. Preferably, the cooling step is performed in a continuous manner on a feed of melt blended polyethylene maintained at a temperature above about 105°C, preferably above about 135°C, passing a stream of the blend through a cooling zone with the shortest possible residence time therein consistent with the lowest possible temperature of blend leaving the cooling zone below about 90°C, preferably below about 75°C, and removing the resulting cooled blend.

Agitation or stirring during the cooling step is not necessary except as associated with rapid heat transfer, e.g., bringing the hot blend to, and moving the cooled blend away from, the cooling surface.

Cable filling grease compositions as described which have been prepared by quick cooling in accordance with this invention can be stored indefinitely before use in cable filling and then used as such in cable filling by cold filling processes with good results in the filling step and excellent performance in the cable product, including resistance to drip, flow and drain from the cable at temperatures below about 80°C.

Alternatively, blended polyethylene compositions of the formulation herein described but which have not been quickly cooled, can be manufactured, stored and shipped without such treatment, then subjected to the treatment in accordance with this invention immediately prior to use. In one such embodiment, the blended polyethylene composition in the molten condition is placed in drums and allowed to cool slowly. In such condition, it is suitable for use in hot filling cable processes but not suitable as such for use in cold filling cable processes. However, if the composition as received in the cable manufacturing plant is heated above its melting point and then quickly cooled in accordance with this invention, the resulting grease product is suitable for use in cold filling cable processes. The heating and quick cooling steps can readily be carried out in simple apparatus in conjunction with the usual cable line, and any surplusage of filler falling from the cable filling station can readily be returned to the melting step.

In yet another embodiment, it is contemplated that the initial blend of polyethylenes in molten condition above its melting point, preferably above about 135°C, would be shipped in insulated tanks from the manufacturing site to the cable filling site without significant intermediate cooling; at the cable manufacturing site, the hot melt blend would be taken from the shipping tank at appropriate rate integrated with the cable filling facility, quick cooled and immediately used as cable filler in cold filling processes. Even if some reheating were necessary to restore the high temperature before the quick cooling step, the practice could result in overall energy conservation.

The following examples further illustrate the invention but are not to be taken as limiting its scope.

EXAMPLE 1

A mixture was composed as follows:
- 92.86 parts by weight polyethylene A
- 6.99 parts by weight polyethylene B
- 0.15 part by weight 4,4'-thio-bis-(2-tert-butyl-5-methylphenol)

Polyethylene A is a low molecular weight polymer product of free-radical initiated polymerization of ethylene in the presence of propylene and has melt flow rate of about 30 dg/min at 50°C through the extrusion plastometer of ASTM D-1238-70 when modified with 0.0200 inch die orifice using 2,160 g total load. Polyethylene B is low density (0.915 g/c) free-radical-induced polymer of ethylene which has melt flow rate (Melt Index) of about 50 dg/min by ASTM D-1238-70 Condition E. Starting polyethylene B contains about 1,500 ppm by weight of 2,6-di-tert-butyl-4-methylphenol.

The mixture was heated with stirring to a temperature between 150° and 200°C until all of polyethylene B was melted and well blended with polyethylene A. The resulting blend product, at a temperature of about 200°C, without cooling, was drawn off into large (55 gallon) drums and allowed to cool slowly by standing in storage. After 24 hours, the drums and contents were still warm.

A sample of the resulting blend product had melt flow rate of about 1.9 dg/min through the extrusion plastometer of ASTM D-1238-70 modified with 0.0200 inch die orifice, at 50°C with 2160 g total load. Other properties were as follows:

| Property | Method | Value |
| --- | --- | --- |
| Viscosity at 135°C | Brookfield* | 135 cp |
| Visc., kinematic, 135°C | ASTM D 445 | 225 cs |
| Melting point | ASTM D 127 | 90°C |
| Density at 23°C | | 0.85 g/cc |
| at 135°C | | 0.73 g/cc |
| Dielectric Constant, $10^5$Hz | ASTM D 150 | 2.2 |
| Dissipation Factor, $10^5$Hz | ASTM D 150 | 0.0005 |

*Model RV using No. 7 spindle at 100 rpm.

The polyethylene blend product as stored in the drums is here identified as Sample 1-D. A portion of that drum material 1-D was taken and processed for one minute at room temperature in a grease worker as described in ASTM D-217 at a rate of 30 strokes per minute to make a worked material which is here identified as Sample 1-DW. Processing in a grease-worker simulates the shearing action which is encountered in pumps used in injecting greases into cables.

Another lot of starting mixture having composition first described above in this Example 1 was heated and melted, and its temperature was adjusted to about 135°C. The melt was then fed continuously to a scraped wall, water-cooled heat exchanger. The residence time of the blend passing through the exchanger was about three minutes, and its exiting temperature was about 70°C. A sample of the resulting quick cooled product is here identified as Sample 1-QC. A portion of that quick cooled material 1-QC was taken and processed for one minute at room temperature in a grease worker as described in ASTM D-217 at a rate of 30 strokes per minute to make a worked material here identified as Sample 1-QCW.

The viscosities of portions of the respective samples were measured on a Brookfield Viscometer, Model RV, using a No. 7 spindle and turning speed varying from 0.5 to 100 rpm appropriate to the viscosity and computing the viscosity in centipoises (cp) from the corresponding scale. The resulting data are recorded in Table 1.

Portions of the respective samples were also tested in a simulated cable drip test. This test is more convenient to carry out on small samples than are full scale filled cable manufacture and testing, and has been found suitable for screening purposes and correlates well with results of full scale tests. The present tests were carried out by applying a liberal coating of the test sample cable filling composition to a piece about 6 or 8 inches long of typical twisted pair insulated telephone cable wire. The so-coated wire pair is hung vertically in a hot air circulating oven maintained at 160°F (71.1°C) and examined after 24 hours. If any of the test filler compound has dripped from the wire, that compound has failed the test. If none of the test filler compound has dripped from the wire, that compound has passed the test. The test is more rigorous than the standard cable filler flow test in that the standard test temperature is only 150°F (65.5°C). The results with the present test compositions are shown in Table 1.

TABLE 1

| Sample No. | Viscosity, Cp at 25°C. | Wire Drip Test at 71.1°C |
| --- | --- | --- |
| 1-D | 44,500 | Fail |
| 1-DW | 17,300 | Fail |
| 1-QC | $2.1 \times 10^6$ | Pass |
| 1-QCW | 250,000 | Pass |

From these data it is seen that the samples (1-D and 1-DW) of drummed material (cooled slowly) failed the drip test. The samples (1-QC and 1-QCW) of material which was quick cooled in accordance with the present invention, passed the drip test. It is also seen that the action of processing the material through standard grease working machinery has the effect of lowering the viscosity of the material at 25°C, without adversely affecting the drip test resistance of sample 1-QCW. The product of quick cooling and working (Sample 1-QCW) simulates the cable filling compound that would be obtained in conventional cold filling processes and provides cables which pass the standard 150°F flow test for cable filling compounds.

EXAMPLE 2

A mixture was prepared similar to that described in Example 1 from the same kinds of ingredients, except as to the proportions thereof, as follows:
- 89.86 parts by weight polyethylene A
- 9.99 parts by weight polyethylene B
- 0.15 part by weight 4,4'-thio-bis-(2-tert-butyl-5-methylphenol)

The mixture was melted and stirred at temperature between 150° and 200°C until the melt was thoroughly blended. The blended melt was then, at a temperature of about 200°C, without cooling, drawn off into large (55 gallon) drums and allowed to cool slowly in storage. This drummed material is here identified as Sample 2-D. It had melt flow rate of about 1.4 dg/min when tested by ASTM D-1238 modified with 0.0200 inch orifice die, at 50°C and 2160 g total load. A portion of the drummed material 2-D was worked in a grease worker as described in Example 1; the resulting worked material is here identified as Sample 2-DW.

Portions of the drummed material 2-D were placed in 4-ounce jars, reheated and re-melted. The melt was then allowed to cool in air to a temperature of about 82°C during a period less than 15 minutes. The resulting quick cooled product is here identified as Sample 2-QC. A portion of that quick cooled material 2-QC was taken and processed in a grease worker as described in Example 1; the resulting quick cooled and worked material is here identified as Sample 2-QCW.

The viscosities of portions of the respective samples were measured, and simulated cable drip tests were carried out, all in accord with the descriptions in Example 1, with results shown in Table 2.

TABLE 2

| Sample No. | Viscosity, Cp at 25°C | Wire Drip Test at 71.1°C |
|---|---|---|
| 2-D | 527,000 | Pass |
| 2-DW | 52,000 | Marginal* |
| 2-QC | >8 × 10$^6$ | Pass |
| 2-QCW | 235,000 | Pass |

*Note: The test product tended to flow from the wire where coated in a thick layer; thin layers did not flow.

The product of quick cooling is suitable for use as cable filling compound in cold filling process and provides cables which pass the standard flow test for cable filling compounds. The quick cooled grease product can be pumped at ambient room temperature in appropriate and conventional grease pumping equipment.

It will be evident to the skilled artisan that many variations and modifications of the invention can be made without departing from its spirit and scope.

What is claimed is:

1. In a method for making a filling compound for electrical cables and devices, which compound comprises a major proportion of low density polyethylene constituent A and a minor proportion of low density polyethylene constituent B, which constituent A has melt flow rate value from about 5 to about 140 dg/min when measured by ASTM D-1238-70 at 50°C and 2,160 g total load using 0.0200 inch orifice die and which constituent B has melt flow rate value from about 0.2 to about 250 dg/min when measured by ASTM D-1238-70 at 190°C and 2,160 g total load using 0.0825 inch orifice die, the compound being a melt blended mixture of the constituents A and B and having melt flow rate value from about 0.1 to about 25 dg/min when measured by ASTM D-1238-70 at 50°C and 2,160 g total load using 0.0200 inch orifice die, the improvement which comprises quickly cooling the melt blended mixture of the constituents A and B from a temperature above the melting point of the mixture to a temperature below about 90°C.

2. The improvement according to claim 1 wherein constituent A has melt flow rate as defined therefor from about 25 to about 35 dg/min, constituent B has melt flow rate as defined therefor from about 20 to about 50 dg/min, there are present in the filler compound, based on the combined weights of the constituents A and B, from about 80 to about 99 percent of constituent A and correspondingly from about 1 to about 20 percent of constituent B, and the melt blended mixture of constituents A and B has melt flow rate as defined therefor from about 0.5 to about 10 dg/min.

3. The improvement according to claim 2 wherein there are present in the compound, based on the combined weight of the constituents A and B, from about 89 to about 95 percent of constituent A had correspondingly from about 5 to about 11 percent of constituent B, and the melt blended mixture of constituent A and B has melt flow rate as defined therefor from about 1 to about 5 dg/min.

4. The improvement according to claim 3 wherein the melt blended mixture of the constituents A and B is quickly cooled from a temperature of at least about 135°C to a temperature of at most about 75°C in a time not more than about 30 minutes.

5. The improvement according to claim 4 wherein the time of cooling from about 135°C to about 75°C is not more than about five minutes.

6. The improvement according to claim 1 wherein the melt blended mixture of the constituents A and B is quickly cooled from a temperature of at least about 135°C to a temperature of at most about 75°C in a time not more than about 30 minutes.

7. The improvement according to claim 6 wherein the time of cooling from about 135°C to about 75°C is not more than about five minutes.

8. In the manufacture of filled telecommunication cables by cold filling process wherein a plurality of insulated conductors are brought together and arranged to form a cable core bundle defining interstices and disposing in such interstices a cable filler compound at nearly ambient temperature whereby the resulting cable core is substantially filled with substantially solid material which resists flowing from the cable at temperatures below about 70°C, and wherein the filler compound is a blend comprising from about 89 to about 95 percent of low density polyethylene constituent A and from about 5 to about 11 percent of low density polyethylene constituent B, based on the combined weights of such constituents A and B, which constituent A has melt flow rate from about 25 to about 35 dg/min when measured by ASTM D-1238-70 at 50°C and 2,160 g total load using 0.0200 inch orifice die and which constituent B has melt flow rate from about 20 to about 50 dg/min when measured by ASTM D-1238-70 at 190°C and 2,160 g total load using 0.0825 inch orifice die, and the blend thereof having melt flow rate from about 1 to about 5 dg/min when measured by ASTM D-1238-70 at 50°C and 2,160 g total load using 0.0200 inch orifice die, the improvement which comprises quickly cooling the filler compound from a temperature of at least about 135°C to a temperature of at most about 75°C in a time not more than about five minutes, and thereafter disposing the resulting compound in the interstices of the cable core.

* * * * *

UNITED STATES PATENT AND TRADEMARK OFFICE
CERTIFICATE OF CORRECTION

PATENT NO. : 3,888,710
DATED : June 10, 1975
INVENTOR(S) : William R. Burk

It is certified that error appears in the above-identified patent and that said Letters Patent are hereby corrected as shown below:

Column 1, line 30, delete "of" and insert --or--; same column, line 31, delete "high" and insert --higher--; same column, line 34, after the word "herewith," delete "s,"; same column, line 43, after "80°C" add a comma --,--; same column, line 57, delete the word "by" and insert --be--.

Column 2, line 62, delete "469,776" and insert --468,776--.

Column 4, line 53, delete "is" and insert --in--.

Signed and Sealed this sixteenth Day of September 1975

[SEAL]

Attest:

RUTH C. MASON
*Attesting Officer*

C. MARSHALL DANN
*Commissioner of Patents and Trademarks*